(12) United States Patent
Terry et al.

(10) Patent No.: US 11,930,453 B2
(45) Date of Patent: Mar. 12, 2024

(54) SYSTEM AND METHOD FOR WIRELESS RECEIVER LOW-POWER WAKE-UP IN A WIRELESS LOCAL AREA NETWORK

(71) Applicant: Morse Micro Pty. LTD., Surry Hills (AU)

(72) Inventors: Andrew Terry, Surry Hills (AU); Michael De Nil, Surry Hills (AU); David Goodall, Surry Hills (AU); Peter Bradley, Surry Hills (AU)

(73) Assignee: Morse Micro Pty. LTD., Surry Hills (AU)

( * ) Notice: Subject to any disclaimer, the term of this patent is extended or adjusted under 35 U.S.C. 154(b) by 188 days.

(21) Appl. No.: 17/466,144

(22) Filed: Sep. 3, 2021

(65) Prior Publication Data

US 2022/0070777 A1    Mar. 3, 2022

(51) Int. Cl.
*H04W 52/02* (2009.01)
*H04W 84/12* (2009.01)

(52) U.S. Cl.
CPC ........ *H04W 52/0229* (2013.01); *H04W 84/12* (2013.01)

(58) Field of Classification Search
CPC .................. H04W 52/0229; H04W 84/12
See application file for complete search history.

(56) References Cited

U.S. PATENT DOCUMENTS

| | | | |
|---|---|---|---|
| 10,129,064 B1 | 11/2018 | Lee et al. | |
| 2008/0132211 A1* | 6/2008 | Keshavarzian | H04M 3/02 455/414.1 |
| 2008/0181155 A1* | 7/2008 | Sherman | H04W 52/0229 370/311 |
| 2014/0185501 A1* | 7/2014 | Park | H04W 52/0238 370/311 |
| 2015/0012761 A1* | 1/2015 | Li | H04W 52/0235 713/310 |
| 2016/0112954 A1* | 4/2016 | Amizur | H04W 52/0235 370/311 |
| 2018/0018185 A1* | 1/2018 | Sun | G06F 21/44 |

(Continued)

FOREIGN PATENT DOCUMENTS

| | | | | |
|---|---|---|---|---|
| WO | WO-2012129101 A1 | * | 9/2012 | G01F 1/66 |
| WO | WO-2020224898 A1 | * | 11/2020 | H04W 52/0216 |

*Primary Examiner* — Mohammad S Anwar
(74) *Attorney, Agent, or Firm* — CP LAW GROUP PC; Cy Bates

(57) ABSTRACT

The disclosure is directed to a system and methods for waking-up a wireless receiver on a wireless network. The method includes the steps of: listening, by the wireless receiver, for signals in a predetermined frequency band periodically and decoding a wake-up key; validating the wake-up key by correlating the wake-up key with values stored in a memory using a first processing device; if the wake-up key is validated, decoding at least one PHY Protocol Data Unit (PPDU) and checking the value of one or more bits of the PPDU to validate the decoded PPDU as a wake-up PPDU; if the wake-up packet is validated, decoding a wake-up address and comparing the wake-up address to the station (STA) wake-up address; if the decoded wake-up address matches the STA wake-up address, powering-up a second processing device and confirming wake-up by exchanging an encrypted frame with Access Point (AP).

17 Claims, 9 Drawing Sheets

(56) References Cited

U.S. PATENT DOCUMENTS

| | | |
|---|---|---|
| 2018/0019902 A1 | 1/2018 | Suh et al. |
| 2018/0132176 A1* | 5/2018 | Abraham et al. |
| 2019/0166557 A1* | 5/2019 | Chen .................. H03F 3/45475 |
| 2019/0210561 A1* | 7/2019 | Middelanis ........... B60R 25/241 |
| 2019/0261274 A1 | 8/2019 | Huang et al. |
| 2019/0306811 A1 | 10/2019 | Balakrishnan et al. |

* cited by examiner

SYSTEM AND METHOD FOR WIRELESS RECEIVER LOW-POWER WAKE-UP IN A WIRELESS LOCAL AREA NETWORK

FIELD OF THE INVENTION

The invention relates to a system and methods for low-power wake-up of a wireless receiver in a Wireless Local Area Network (WLAN). In particular, the invention relates to low-power wake-up of an IEEE 802.11ah enabled station.

BACKGROUND

The demand for wireless connection of devices embedded in objects of everyday use has led to the development of new wireless network standards.

Most WLANs are based on the Institute of Electrical and Electronics Engineers (IEEE) 802.11 standard which consists of a series of half-duplex over-the-air modulation techniques that use the same basic protocol. The 802.11 protocol family employs carrier-sense multiple access (CSMA) with collision avoidance whereby equipment listens to a channel for other users (including non 802.11 users) before transmitting each packet.

WLANs generally comprise one or more access points (APs) and several connected devices or stations (STAs). An AP is a physical or a virtual device that provides access, via a wireless medium (WM), for associated STAs to another network, such as the Internet. Devices in a WLAN communicate with each via the shared WM.

The APs operate over a high bandwidth physical layer protocol data unit (PPDU). For example, common home Wi-Fi networks are based on IEEE 802.11n which defines a standard for WLAN medium access control (MAC) and physical (PHY) layers and operate on the 2.4 GHz or 5 GHz frequencies.

STAs send, receive, and/or interfere with each other on the shared WM. A STA is in-range of another STA when it can detect a transmission from the other STA directly. To address this issue, the available bandwidth is divided in several subchannels. In IEEE 802.11n, for example, the sub-band covers 80 MHz and is divided in 20 MHz or 40 MHz subchannels.

IEEE 802.11ah is another wireless networking standard that uses the 900 MHz license exempt bands to provide extended range Wi-Fi networks. It also benefits from lower energy consumption, allowing the creation of large groups of stations or sensors that cooperate to share signals, supporting the concept of the Internet of Things (IoT).

Some of the STAs connected to a WLAN, in particular an 802.11ah WLAN, may be powered using a battery. In order to save energy, these STAs may enter sleep-mode when not receiving packets.

In order to be responsive, battery-powered STAs have to 'wake-up' frequently to listen for requests from the AP. The wake-up process generally requires powering several electronic modules hosted on such devices and therefore uses a significant amount of energy. Most Wi-Fi devices for example wake up every 300 ms. Such frequency of wake-up events can become the main energy drain for battery powered devices and can severely affect battery life and operability.

Solutions have been proposed to reduce the amount of energy required by STAs operating under the 802.11 family of protocols. For example, a Wake-up Radio (WUR) Study Group was created within the IEEE 802.11 Working Group to develop project authorization request (PAR) and criteria for standard development (CSD) to enable an energy efficient data reception mode without increase of latency for the 802.11 standard.

The proposed solutions generally require the use of a secondary radio that is arranged to receive dedicated 802.11 compatible OFDM wake-up packets or simply detect OOK sequences on a modulated carrier. However, such an approach requires additional radio hardware and may not be optimal in a number of situations.

SUMMARY OF THE INVENTION

The invention relates to an integrated architecture that can implement a wireless communication protocol with a reduced requirement for power consumption and methods to implement a low-power wake-up when such architecture is used as a wireless receiver, in particular a battery-operated receiver.

According to the invention, for the majority of time, the receiver architecture is kept in 'sleep mode' unless a genuine wake-up signal is detected.

A reduced portion of the architecture is configured to listen for the wake-up signal periodically, for example every 300 ms. When such a signal is detected, a wake-up process is initiated, and one or more additional modules of the architecture are powered-up.

This approach allows for an efficient management of energy by the STA by providing a simple, low energy wake-up process whilst preventing malicious denial-of-sleep (DoS) attacks by using low power wake-up validation and a shelter protocol.

The architecture comprises several modules, each including different submodules and circuits that enable data exchange over the wireless channel. The principal modules of the architecture include: an RF front-end module arranged to receive radio frequency signals; an analog-to-digital (ADC) converter; a physical layer processor (PHY); a data link layer processor (MAC); a transport layer processor (CPU/HOST); memories; and input/output interfaces.

In accordance with the invention, the low-power wake-up process utilizes the existing RF radio used for data exchange on the WLAN and no dedicated radios are required.

The portion of architecture configured to listen for the wake-up signals may comprise one or more analog circuits, such as one or more RF receivers, active registers, and correlators.

A processing device, such as a portion of a PHY processor may also be used for decoding. The energy used by these components to monitor for the wake-up signal is lower than the energy required when the entire STA is powered-up.

In accordance with embodiments, portions of the STA architecture are powered-up in stages as the incoming wake-up signal is verified. For each stage, the validity of the wake-up signal is checked and modules that use more energy are powered-up.

In accordance with a first aspect, the present invention provides a method for waking-up a wireless receiver on a wireless network, the method comprising the steps of: listening, by the wireless receiver, for signals in a predetermined frequency band periodically and decoding a wake-up key; validating the wake-up key by correlating the wake-up key with values stored in a memory; if the wake-up key is validated, decoding at least one PHY Protocol Data Unit (PPDU) using a first processing device and checking the value of one or more bits of the PPDU to validate the decoded PPDU as a wake-up PPDU; if the wake-up packet is validated, decoding a wake-up address, and comparing the address to the station (STA) wake-up address.

In some embodiments, the method further comprises the step of powering-up a second processing device to decode a media access control (MAC) address encoded in the data field of the wake-up PPDU.

In embodiments, the wake address may be encoded in a PPDU preamble.

The method may further comprise the step of confirming the wake-up event with the AP by exchanging a frame with an Access Point (AP). If the AP confirms wake-up, data exchange can continue.

If the wake-up key is not validated (C), the wake-up detect module sends the wireless receiver back to sleep-mode. Furthermore, a new wake-up key may be requested from the AP if the value of the false wake-up counter is higher than a predetermined false wake-up threshold value, if the wake-up packet cannot be validated, if a wake-up address cannot be validated, or if genuine wake-up is not confirmed with the AP. In some instances, the threshold value is between 3 and 10.

In embodiments, the method further comprises the step of triggering a shelter protocol if the value of the false wake-up counter is higher than a predetermined false wake-up threshold value or the step of requesting new wake-up keys from the AP is performed more than a predetermined number of times.

The shelter protocol may comprise the step of temporarily stopping the wireless receiver from listening for signals for a period of time. The period of time may be 1 minute, 30 second, 10 seconds, 1 second or less than 1 second. The duration of the protocol may vary depending on whether the protocol has been activated in the recent past. For example, the duration may be increased if the protocol is activated multiple times in a row. In some instances, the shelter interval doubles each time the protocol is re-activated.

In embodiments, the step of listening for signals in a narrow frequency band periodically and decoding a wake-up key is performed at predetermined time intervals, for example every 300 ms.

In embodiments, the step of listening for signals in a narrow frequency band comprises the step of enabling an analog-to digital-converter (ADC) and a processing device in a low-power mode. In low-power mode the ADC and the processing device may be driven using a clock frequency lower than the clock frequency used when the ADC and the processing device are in a normal-power mode.

In embodiments, the first processing device comprises a physical layer processing device (PHY) and the second processing device comprises a datalink/media access control layer processing device (MAC).

In embodiments the wake-up key is encoded in the preamble of the PPDU. The wake-up key may be encoded in the short training field (STF) of the PPDU, for example. In alternative embodiments the wake-up key is encoded in a proprietary field transmitted before the STF field (beginning of the PPDU).

The wake-up key may be encoded using a coding scheme such as a Manchester or a Barker sequence that allows determining unwanted false wakeups or errors in a short time.

The step of validating the decoded wake-up key may comprise correlating one or more bits of the key with respective values stored in a memory of the first processing device.

In embodiments, the step of checking the value of a plurality of bits of the PPDU comprises checking one or more bits of a signal field (SIG) of the PPDU purposely configured for the wake-up PPDU. A clear to send frame (CTS) or a beacon frame can be sent on the WM before a wake-up PPDU is forwarded to the relevant STA(s). The proprietary wake-up PPDU can be configured to take a relatively small amount of time on the medium, therefore the medium can be reserved for a limited time.

The proprietary wake-up PPDU has a SIG field configured to validate wake-up. The SIG field may comprise a 'type' field, a 'group address' indication field and an 'address field' that contains the wake-up address. The SIG field may have the same length of a S1G SIG field.

In some embodiments, the wake-up PPDU can retain the S1G structure and use the SIG field to flag the PPDU as a wake-up PPDU by setting the NDP field and one of the reserve bits to 1.

In embodiments, the step of powering-up the entire architecture and beginning data communication with Access Point (AP) to confirm genuine wake-up comprises the step of sending an encrypted frame to the AP to elicit buffered frames from the AP.

In embodiments, the method further comprises the step of collecting wake-up signal related data for wake-up signals that cannot be validated and transmitting the collected data to the AP. The collected wake-up signal related data may include the received signal strength indication (RSSI).

In accordance with a second aspect, the present invention provides a method for waking-up a receiver on a wireless network, the method comprising the steps of: listening for an incoming wake-up signal at a predetermined time interval via the RF receiving module; the wake-up signal comprising frequencies in a narrow-band encoding a wake-up key; enabling an analog-to digital converter (ADC) and a physical layer (PHY) processor in a low-power mode by driving the ADC or the PHY processor using a low-frequency clock signal generated using an on-board clock device which generates clock signals to drive other modules of the station; and if the wake-up key is validated, powering-up the hardware necessary to initiate data communication with Access Point (AP).

In accordance with the third aspect, the present invention provides a method for preparing a PHY Protocol Data Unit (PPDU) for waking-up a wireless receiver on a wireless network, the method comprising the steps of: encoding, by a wireless transmitter, a wake-up key in a preamble of the PPDU; encoding, by the wireless transmitter, a signal field (SIG) configured to confirm that the PPDU is a wake-up PPDU to one or more receivers connected to the wireless network; and
encoding, by the wireless transmitter, a wake-up address into the SIG field or a data field of the PPDU, the wake-up address being configured to address one or more receivers connected to the wireless network.

In some embodiments, the PPDU used to wake-up the wireless receiver is purposely built to wake-up one or more receivers and does not include a data field.

In other cases, the AP can wake-up the receiver and deliver a data payload simultaneously (in the MPDU) by transmitting a wake-up PPDU without data field on the secondary subchannel and a PPDU with data field on the primary subchannel.

In accordance with a fourth aspect, the present invention provides a wireless communication device comprising: an RF module arranged to receive and transmit radio frequency signals, an analog-to-digital or digital-to-analog converter, a plurality of digital filters; a plurality of processing devices;

and a memory comprising instructions to perform a method in accordance with the first, second or third aspect.

In embodiments, the wireless device is a wireless station (STA). The device may comprise a wake-up detect module arranged to generate the low-frequency clock signal. The low-frequency clock signal may be generated using an on-board clock which generates clock signals to drive other modules of the station.

BRIEF DESCRIPTION OF THE DRAWINGS

For proper understanding of the invention, reference should be made to the accompanying drawings, wherein.

DETAILED DESCRIPTION

Figure 1:
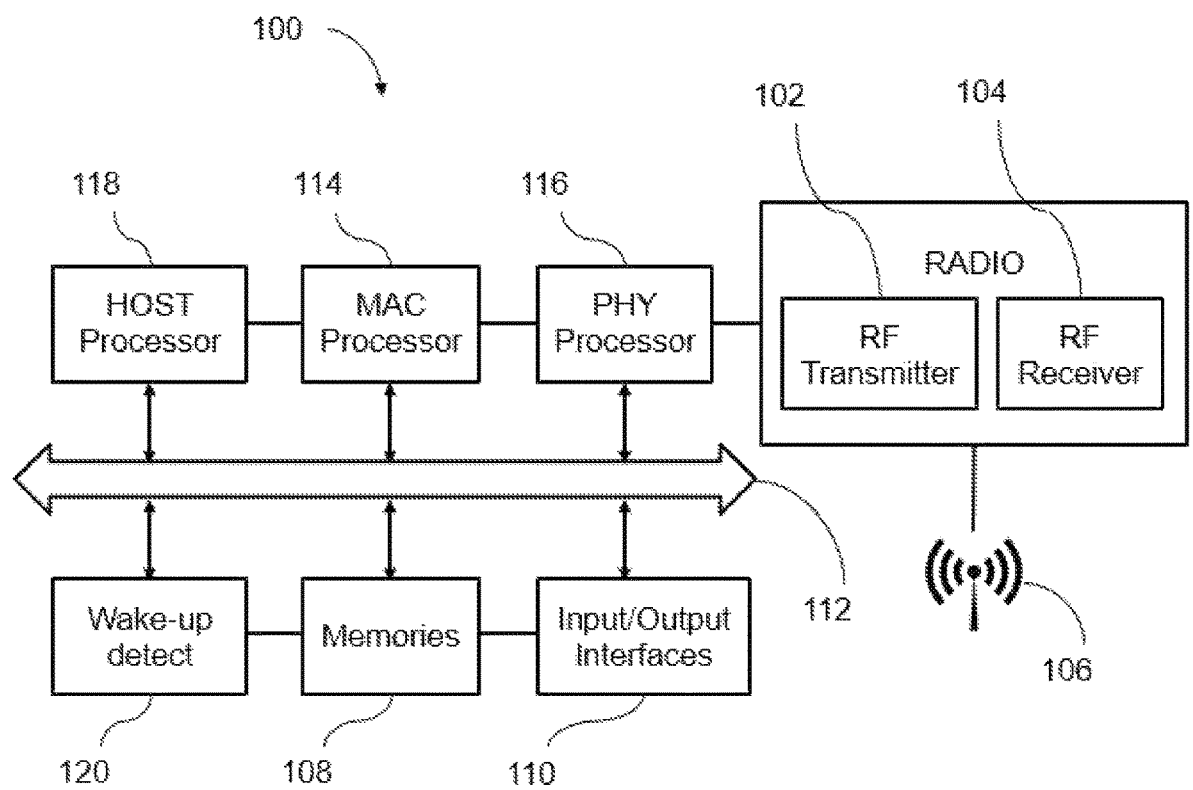
FIG. 1 shows a block diagram of a WLAN device implementing a wireless receiving station (STA) or access point (AP) in accordance with an embodiment of the disclosure.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, the term "access point (AP)" means a networking device capable of communicating with several client devices (stations) over a wireless network and capable to interface with a wired network. For example, an 802.11 Wi-Fi access point.

The term "wireless receiving station (STA)" means a networking device capable of communicating with an access point over a wireless network.

The term "Physical (PHY) processor" means processing hardware capable of implementing functions of the PHY layer of the IEEE802.11 standard to interface with the wireless medium.

The term "Media Access Control (MAC) processor" means processing hardware capable of implementing functions of the MAC layer of the IEEE802.11 standard.

The term "PHY Protocol Data Unit (PPDU)" means basic unit of information transmitted over the network at the PHY level.

The term "MAC Protocol Data Unit (MPDU)" means basic unit of information at MAC level.

The term "antenna unit" means an assembly comprising an antenna for transmitting or receiving signals over the wireless medium.

The term "memory banks" means any form of digital memory for storing digital information.

The term "input and output interfaces" means hardware or software data exchange means for transferring data to and from electronic devices. For example, digital data exchange or diagnostic serial buses, such as GPIO bus or USB.

The increasing use of connected devices and the Internet of Things (IoT) is challenging traditional wireless local area networks (WLANs) with respect to range (area covered by the network) and power consumption of stations (STA) that may be powered using a battery.

Battery-powered STAs and remote sensors have to 'wake-up' frequently (for example every 300 ms) to listen for requests from the access point (AP). The wake-up process generally requires a significant amount of energy and can become the main energy drain for battery powered devices, severely affecting battery life and operability.

Embodiments of the present disclosure provide a methodology and a system to trigger a staged wake-up of one or more stations connected to a WLAN. The STA wakes up only when required and the genuinity of the wake-up signal is verified in stages each time a hardware resource of the STA device is powered-up.

The AP can transmit a purposely configured PPDUs used to wake-up the wireless receiver. This type of wake-up PPDU can be kept simple and achieve the task of waking-up specific receivers only when necessary.

The AP can also configure wake-up so that the receiver is woken-up and a data payload delivered simultaneously transmitting a wake-up PPDU on the secondary subchannel and a data PPDU on the primary subchannel (if a secondary subchannel is available).

In embodiments, the PPDU includes a wake-up key that can be decoded by the STAs using minimal hardware resources. The wake-up key can be encoded in a portion of the PPDU preamble, such as a portion of the PHY header or a proprietary signal transmitted at the beginning of the proprietary PPDU. Additional verification steps can be performed at PHY level by using dedicated bits of the PPDU and a wake-up address. Further wake-up signal verification can be performed at Media Access Control (MAC) level.

FIG. 1 shows a block diagram of a WLAN device 100 implementing a STA or AP according to some embodiments.

Each of the network devices includes a MAC layer and a PHY layer in accordance with IEEE 802.11.

The WLAN device 100 includes a radio frequency (RF) transmitter module 102, an RF receiver module 104, an antenna unit 106, one or more memory banks 108, input and output interfaces 110 and communication bus 112. Furthermore, the device 100 includes a MAC processor 114, a PHY processor 116 and a HOST processor 118. These processors can be any type of integrated circuit (IC) including a general processing unit, an application specific integrated circuit (ASIC) or RISC-V based ICs, amongst others.

The memory 108 stores software including at least some functions of the MAC layer. Each processor executes software to implement the functions of the respective communication/application layer.

The PHY processor 116, in particular, includes a transmitting signal processing unit and a receiving signal processing unit and manages the interface with the wireless medium (WM). The PHY processor 116 operates on PPDUs by exchanging digital samples with the radio module which comprises the RF transmitter 102, the RF receiver 104, analog-to-digital converters and digital filters.

The MAC processor 114 executes MAC level instructions and manages the interface between the STA application software and the WM, through the PHY processor 116. The MAC processor 114 is responsible for coordinating access to the WM so that the Access Point (AP) and STAs in range can communicate effectively. The MAC processor adds header and tail bytes to units of data provided by the higher levels in the STA and sends them to the PHY layer for transmission. The reverse happens when receiving data from the PHY layer. If a frame is received in error, the MAC processor manages the retransmission of the frame.

The wake-up detect module 120 is configured to manage necessary hardware resources to operate a low-power wake-up process in accordance with embodiments. For example, the wake-up detect module 120 may comprise PHY level software arranged to recognize the wake-up key encoded in the PPDU. Furthermore, the wake-up detect 120 may be arranged to manage powering-up of hardware resources in the STA, as wake-up is progressively validated. Finally, the wake-up detect 120 may be configured to detect fraudulent wake-up attempts by managing a wake-up counter and arrange for new wake-up keys being set up if such attempts are detected. The necessary instructions that enable operation of the wake-up detect 120 may be stored in the memory banks 108.

In some embodiments, the wake-up detect 120 may comprise dedicated hardware, such as correlators, memory and, in some instances, circuitry to provide modified clock signals to hardware devices in the STA.

The HOST processor 118 interfaces with the MAC layer and is responsible for running higher level functionalities of the STA.

The PHY processor 116, the MAC processor 114, the HOST processor 118, the wake-up detect 120, memories 108 and input/output interfaces 110, communicate with each other via the bus 112. The memory 108 may further store an operating system and applications. In some embodiments, the memory may store recorded information about captured frames and packets. The input/output interface unit 110 allows for exchange of information with a user of the STA.

The antenna unit 106 can include a single antenna or multiple antennas to implement Multiple Input Multiple Output (MIMO) techniques.

Figure 2A:
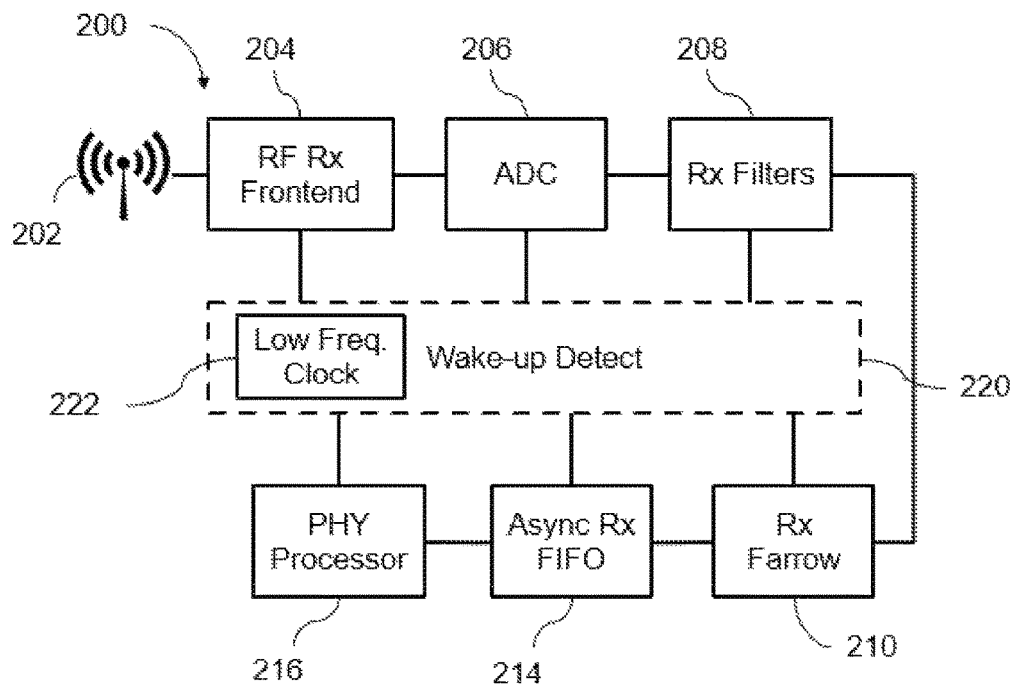
FIG. 2A shows a schematic diagram of a RF receiver for a WLAN STA.

FIG. 2A shows a schematic diagram of a RF receiver 200 for a WLAN STA. The receiver comprises an antenna 202 arranged to receive RF signals travelling on the WM. The antenna is connected to an RF frontend module 204, in some instances through an amplifier. The RF frontend module 204 performs a number of analog operations on the received signal, such as mixing and low-pass filtering to bring the signal to the baseband.

The baseband signal is, in turn, converted into a digital signal using analog-to-digital converter (ADC) 206. Digital filtering is performed on the converted signal via RX filters 208 and RX Farrow 210 and the filtered signal is stored in a circular RX FIFO memory structure 214. The digital signal stored in RF FIFO is made available to a number of modules of the STA, in particular the PHY processor 216 that decodes the PPDU and performs frequency synchronization operations, subchannel detection and demodulation. The PHY layer interfaces with the WM and provides services to the MAC layer to move MAC Protocol Data Units (MPPDUs) between two or more STAs on the WM.

In order to receive and decode a PPDU correctly the STA hardware platform is woken-up at regular intervals to check the WM for incoming signals. For battery-powered STAs and remote sensors the wake-up process and the time spent awake without receiving incoming packets represents a significant amount of energy drain.

The introduction of the wake-up detect module allows managing the hardware resources to be powered-up in stages as the need for full station wake-up is confirmed. In some embodiments, hardware resources brought on-line can be operated in a low-power mode while the validity of a wake-up signal is confirmed, for example by driving such hardware resources using a lower frequency clock signal provided by a dedicated quartz element, a very low power low frequency RC oscillator on-chip (calibrated periodically to the crystal), or an on-board general oscillator.

Figure 2B:
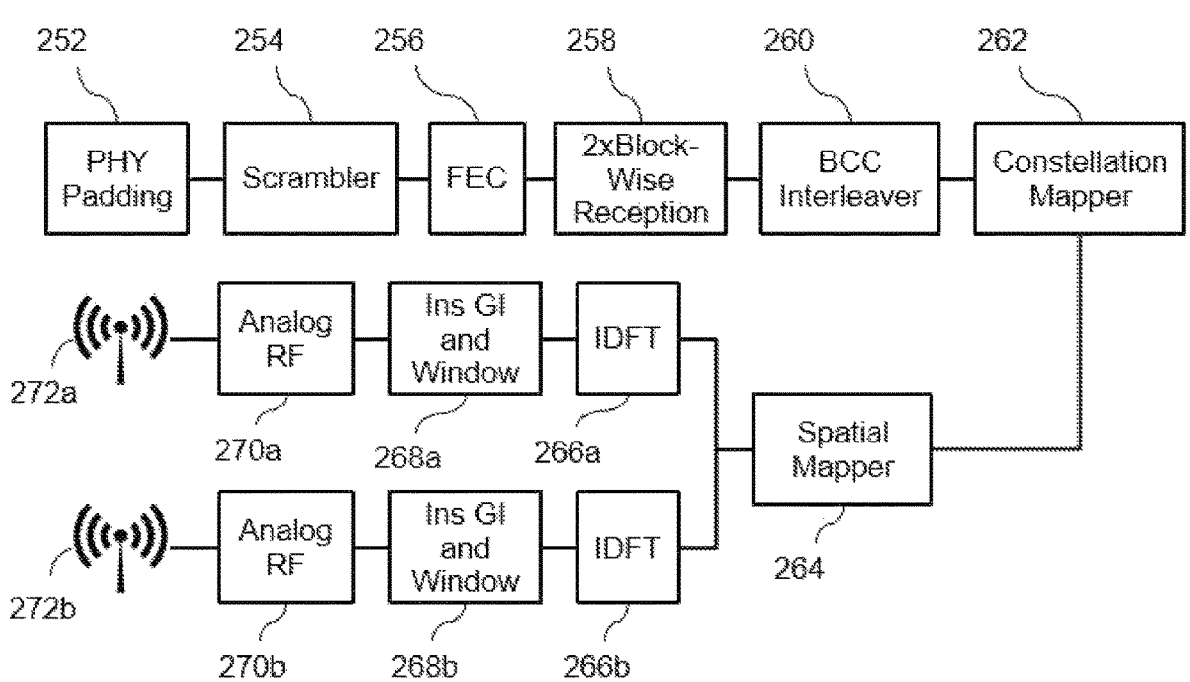
FIG. 2B shows a schematic diagram of the transmission process used to generate a data field of a PHY Protocol Data Unit (PPDU) in accordance with an embodiment of the disclosure.

FIG. 2B shows a block diagram depicting a transmitter architecture 250 that is used to compile and transmit PPDUs over the WLAN. The transmission process for generating a data field of a PPDU with a predefined modulation scheme (MCS10 either BCC or LDPC encoded) and associated PHY level resources. Wake-up PPDUs can be compiled and transmitted following a process described in some of the sections below with reference to FIG. 6A.

In a WLAN based on the IEEE 802.11 family of protocols, communication takes place between a STA and an AP. Both the AP and the STA (or sensor) may be based on a hardware platform in line with the schematic shown in FIG. 1. In order to save energy, in particular for battery operated STAs, the components of the STA architecture can be kept in sleep-mode when not receiving data packets. STAs are woken-up periodically, for example every 300 ms, to check whether packets are available on the WM. The normal 802.11 wake-up process generally requires powering-up all the processing resources of the STA (PHY processor 116, the MAC processor 114, the HOST processor 118) and consumes a non-negligible amount of energy.

After wake-up is completed, the STA senses the WM for an incoming PPDU. If no PPDU is detected, the STA can go back to a sleep mode after a predetermined period of time. Alternatively, if a PPDU is detected on the WM, such PPDU can be decoded in its entirety and, after the data payload is extracted, the STA can check whether the payload contains any data packets addressed to it. The steps of receiving and decoding the PPDU and checking addresses, also require a non-negligible amount of energy.

Embodiments of the present disclosure provide techniques to sense the WM using a reduced amount of energy and wake-up the STA in stages, only when a specific PPDU that carries a specific wake-up key is present on the WM. The wake-up PPDU carries a wake-up address that allows selecting a specific STA, or a family of STAs for wake-up.

Figure 3:
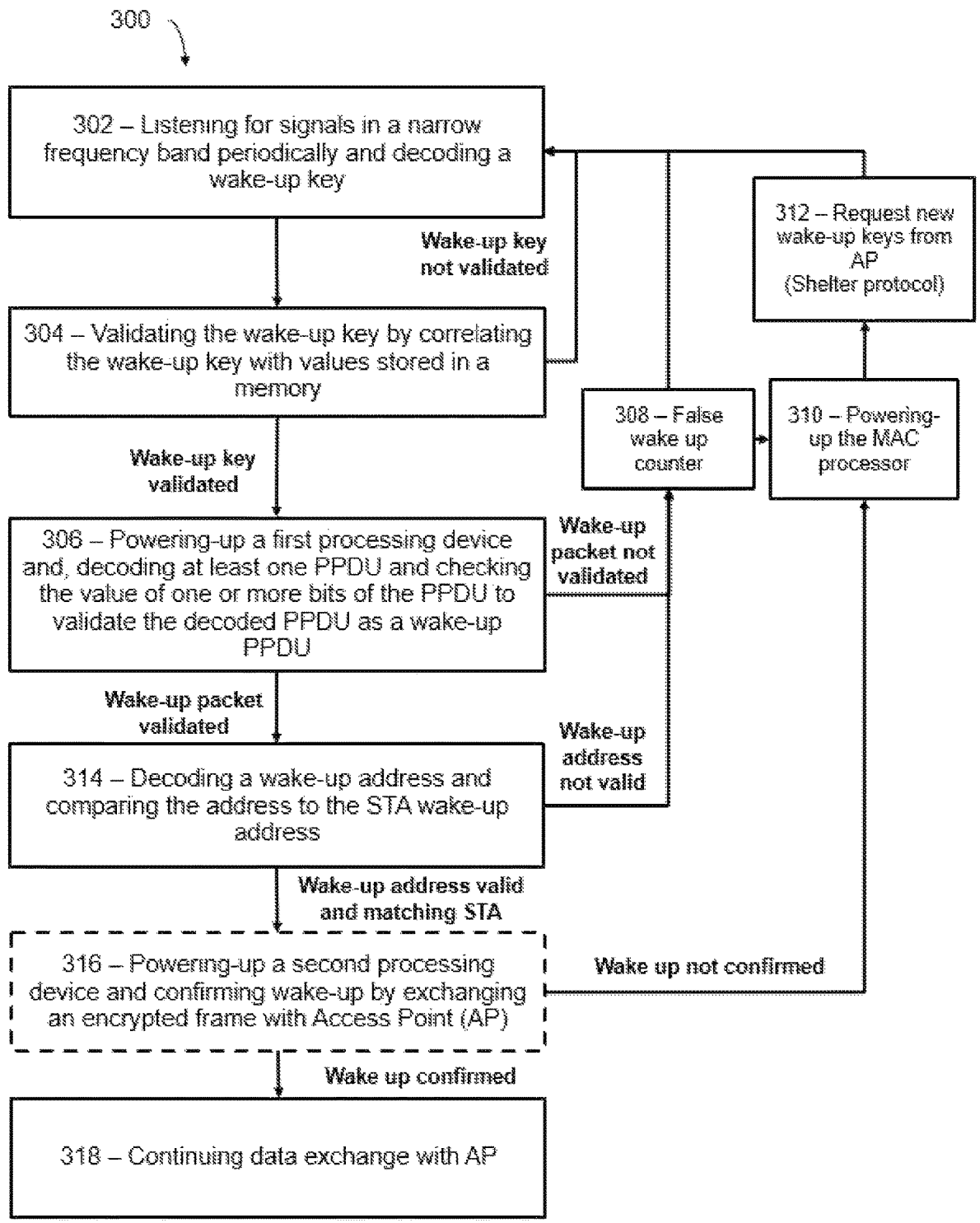
FIG. 3 shows a flow diagram outlining method steps for waking-up a wireless receiver in accordance with an embodiment of the disclosure.

FIG. 3 shows a flow diagram outlining method steps for performing a tiered wake-up process for a wireless receiver connected to a WLAN, such as a STA, as the one shown with reference to FIG. 1 and FIG. 2.

The STA can be configured to listen for a signal in a predetermined frequency band periodically and decoding a wake-up key encoded in the signal, 302. The wake-up key is encoded so that the STA can decode it using limited hardware resources and without having to wake-up the entire architecture. In some embodiments the wake-up key is encoded in the preamble of the PPDU.

The decoded wake-up key is compared, for example using some correlators, with values stored in a memory accessible by a first processing device for validation 304.

The decoding and validation of the wake-up key is performed using hardware registers and correlators that use a minimal amount of energy, without powering-on any processors. In some instances, the PHY processor may be in a low-power mode. The memory hosting the comparison values may be on-board the PHY processor or a small portion of external memory. During decoding and validation, the radio and the PHY processor are configured to minimize energy consumption by decoding the wake-up key in a narrow frequency range. All other hardware resources of the STA are kept in sleep-mode.

If a valid wake-up key cannot be found, the STA goes back into sleep mode until the next predetermined listening period.

If the wake-up key is validated, the PHY processor proceeds to decoding a further portion of the PPDU and checks the value of a plurality of bits in the SIG field to confirm the validity of the wake-up PPDU, 306.

For example, when a proprietary PPDU is used as a wake-up PPDU the SIG field can have one or more reserved bits to flag the PPDU as a wake-up PPDU.

If the validity of the wake-up PPDU cannot be confirmed, despite a wake-up key has been found, the wake-up detect module increases the value of a false wake-up counter stored in a memory, 308, and the STA goes back into sleep-mode until the next predetermined listening period.

If the value of the false wake-up counter reaches a predetermined threshold value, for example 10, the wake-up detect module may deem the wake-up key compromised, power-up the MAC layer of the STA, 310, and request a new wake-up key from the AP, 312.

In the instance where the wake-up packet is found to be valid, a wake-up address is decoded and compared to a range of allowable addresses. The list of allowable addresses may include all allowable wake-up addresses for the STAs connected to the WLAN, including the wake-up address of the STA decoding the packet.

Figure 6A:
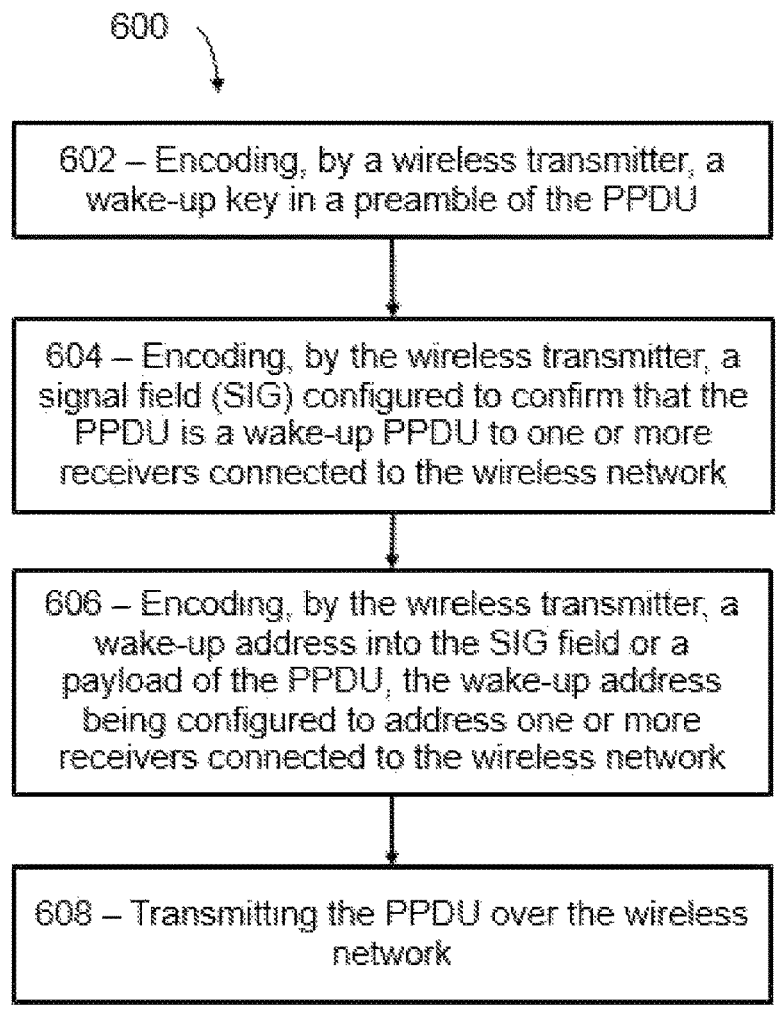
FIG. 6A shows a flow diagram outlining method steps for preparing a PHY Protocol Data Unit (PPDU) for waking-up a wireless receiver on a wireless network.
Figure 6B:
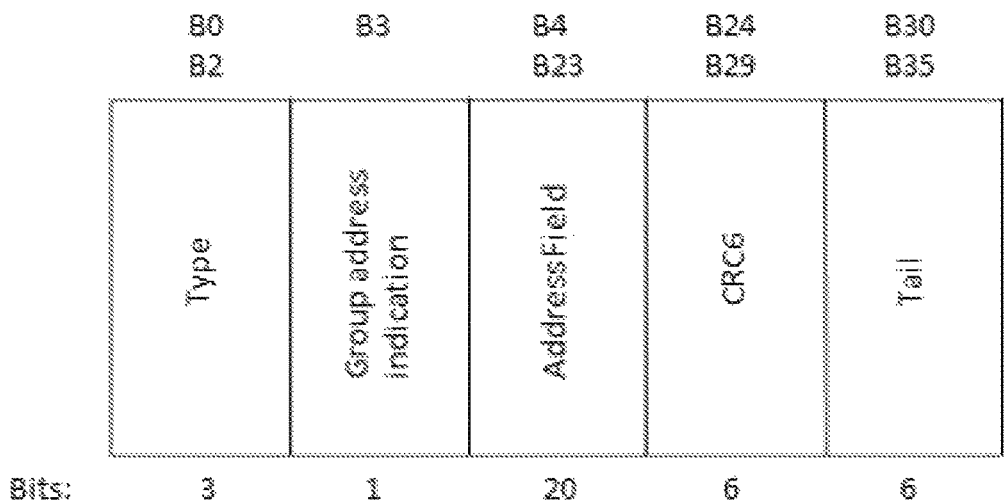
FIG. 6B shows a configuration of SIG fields used in such wake-up PPDUs in accordance with an embodiment of the disclosure.

The wake-up address can be encoded in the proprietary SIG field, as shown with reference to FIG. 6B, and can be a group address or a STA specific address. The proprietary SIG field may have the same length of a S1G SIG field to maintain the same timing in PPDU decoding.

In some embodiments, the wake-up PPDU can retain the S1G structure and use the SIG field can be structured to flag the PPDU as a wake-up PPDU by setting the NDP field and one of the reserve bits to 1.

In these embodiments, the wake-up address may be encoded in the SIG filed in a shorter form.

If a relevant address can be found, the wake-up detect module powers up the entire STA architecture, the wake-up packet is acknowledged and communication with the AP begins, 316. A relevant address can be a direct address of the STA or a multicast address that is configured to wake-up a plurality of STAs or all STAs connected to the WLAN.

Alternatively, if a relevant wake-up address cannot be found, the wake-up detect sends the STA back into sleep mode until the next predetermined listening period. In some instances, for example when a MAC level address cannot be detected in several MPDUs, the wake-up key may be deemed as compromised and a request for a new wake-up key may be sent to the AP, 312.

In the case of direct STA wake-up, a final encrypted message is exchanged between the STA and the AP to confirm that wake-up was requested and communication can commence, 318. If wake-up is not confirmed by the AP in the encrypted message the wake-up key is deemed as compromised and the AP sends a new wake-up key to the STA.

In the instance where a plurality of STAs are woken-up simultaneously using a multicast wake-up address, the AP begins sending multicast traffic in the WM directly, instead of confirming wake-up with each STA.

If the wake-up detect module detects a high number of non-genuine wake-up events, it can trigger a shelter protocol that, in addition to requesting a new wake-up key to the AP, configures the STA in a sleep-mode for an extended period, for example, several minutes. The duration of the shelter protocol may be increased progressively if several fraudulent wake-up attempts are detected, for example during a denial of sleep attack (DoS).

Figure 4:
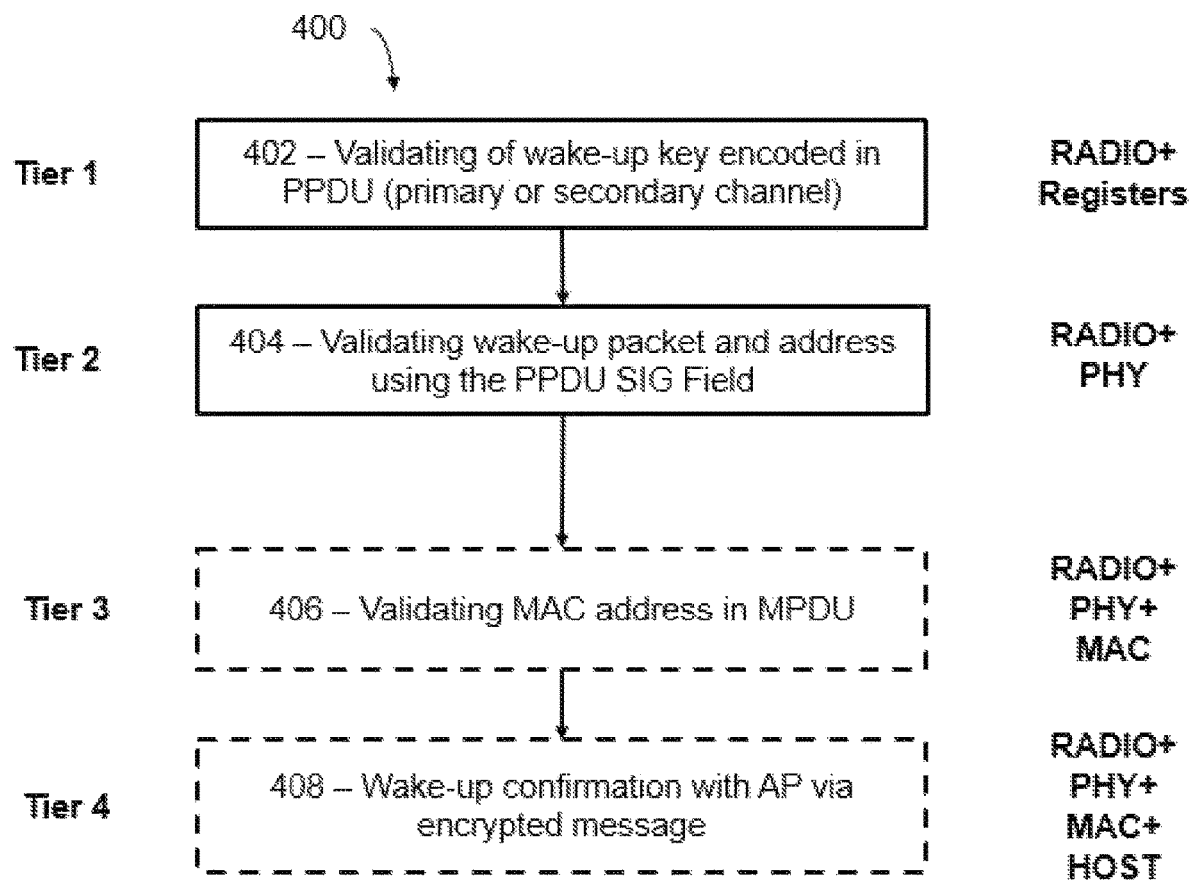
FIG. 4 shows a simplified representation of the tiered wake-up process of FIG. 3.

FIG. 4 provides a high-level simplified representation of the tiered wake-up process described above with reference to FIG. 3. FIG. 4 shows the two main tiers used to validate the wake-up from the signal demodulation and wake-up key correlation (tier 1) to the final encrypted confirmation of wake-up provided by the AP to the STA (tier 4). The tier 3 and 4 checks are optional and therefore shown using dashed lines. FIG. 4 also shows the components of the STA architecture that are required to perform each validation step (right side). The tier 1 validation involves decoding the wake-up key using low power. The tier 2 validation involves use of the full PHY processor to confirm a wake-up PPDU using the SIG field of the PHY preamble. Tier 3 involves use of the full MAC layer and validation of a MAC level address. Finally, tier 4 requires a packet exchange with the AP to confirm the genuinity of the STA wake-up.

Figure 5A:
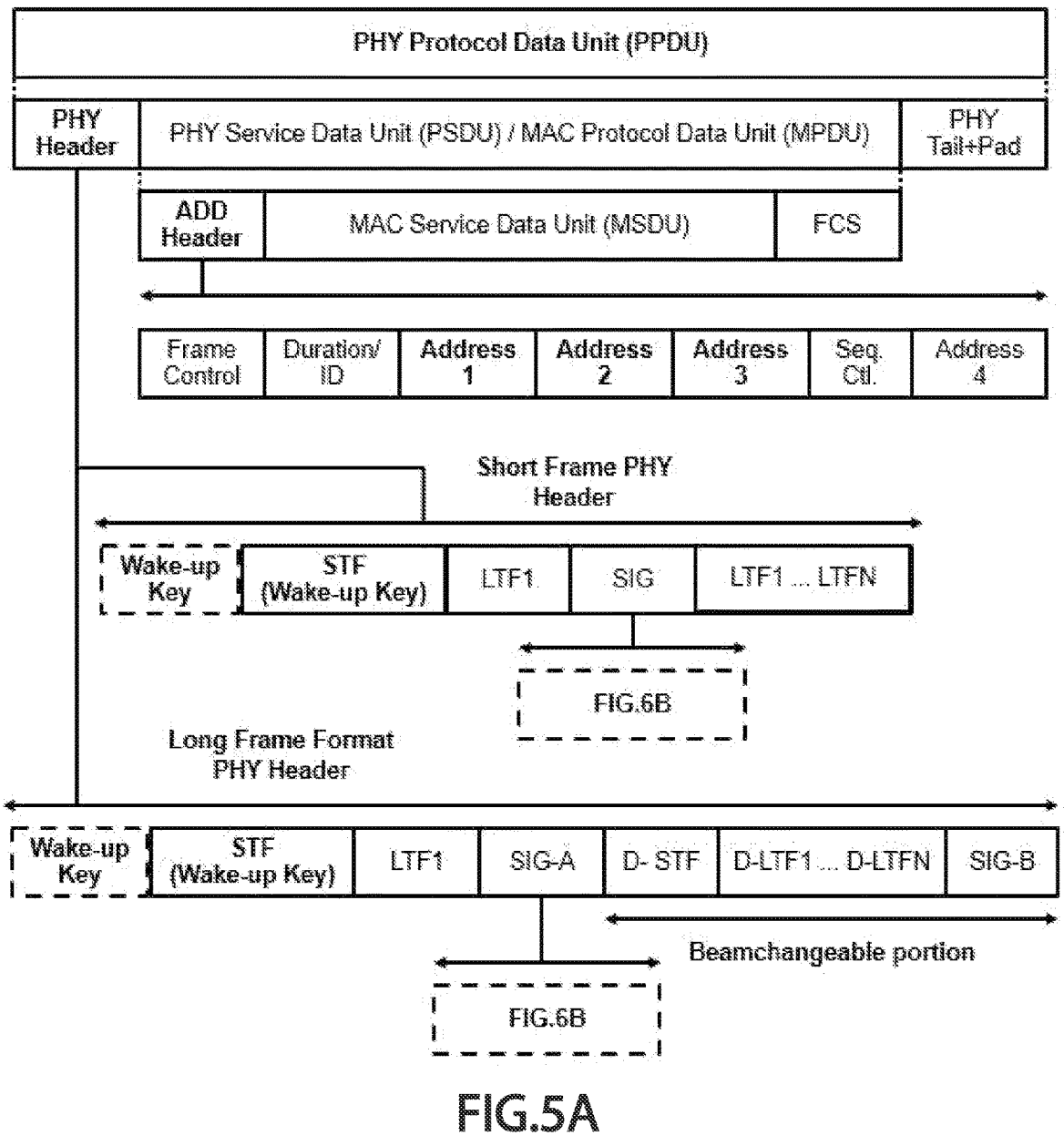
FIG. 5A shows schematic representations of the PHY Protocol Data Unit (PPDU), MAC Protocol Data Unit (MPDU)

FIG. 5A shows schematic representations of the PHY Protocol Data Unit (PPDU), MAC Protocol Data Unit (MPDU) and the fields used to implement staged wake-up in accordance with an embodiment of the disclosure (in bold). FIG. 5A shows a PPDU compatible with STAs that use the IEEE 802.11ah standard also known as S1G PHY PDU, however, the scope of this disclosure is not limited to such standard. A person skilled in the art would recognize that the methodology described herein could be applied to other Wi-Fi standards with minor modifications.

The PHY Protocol Data Unit is encoded and transmitted over the WM on a wireless channel by an AP or STA. This disclosure will focus on a PPDU compiled by an AP and transmitted to one or more STAs with the aim of performing a low power wake-up in accordance with embodiments.

WLANs generally operate on a specific frequency band. IEEE 802.11ah WLANs in Australia, for example, can operate in the 915 MHz-928 MHz subband. The subband is generally divided in subchannels with predefined bandwidths. For IEEE 802.11ah the subchannels have bandwidths of 1 MHz, 2 MHz, 4 MHz, and 8 MHz in Australia and some other regulatory domains (16 MHz is available in the US). The subchannel used for transmission of the PPDU is the primary subchannel Primary subchannels >=2 MHz are divided into further primary and secondary subchannels, for example a 2 MHz primary subchannel consists of a 1 MHz primary and an adjacent 1 MHz secondary subchannel. The configuration of the PPDU may vary slightly depending on the bandwidth of the subchannel being used for transmission and format parameters. For example, the 1 MHz PPDU can be used in S1G and S1G duplicate formats. For channel bandwidths higher than or equal to 2 MHz, the PPDU can be used in SHORT or LONG formats, as shown in FIG. 5. More detailed information on PPDU formats can be found at section 23 of the IEEE 802.11ah standard publicly made available by the IEEE. FIG. 5 shows the short and long general formats of the S1G PPDU. It is understood that a person skilled in the art would be able to apply the methodology disclosed to any variations of the S1G PPDU by making minor modifications.

To allow for fast and low power decoding of the wake-up key, the wake-up PPDU is configured to be compatible with hardware used to decode the PHY preamble which is already STAs connected to the network. The key is encoded on the PHY header of the PPDU regardless of whether the wake-up PPDU is configured using a proprietary format or a S1G compatible format. The key is encoded in the PHY header in a manner so that only PHY processor resources and a low power budget can be used to decode and verify the key.

FIG. 5A shows the configuration of the PHY header for Short Frame (S1G_SHORT) and the Long Frame (S1G_LONG). Both frames begin with the Short Training Field (STF). The STF fields are identical in format for all SIG1 PPDUs and only vary in length. STF is 2 symbols long for S1G_SHORT and S1G_LONG and 4 symbols for S1G_1M, which is the 1 MHz subchannel PPDU. The symbols of the STF are used to assist the wireless receiver in identifying that an 802.11 frame is about to start, synchronizing timers, and selecting an antenna. Any 802.11 device that is capable of OFDM operation can decode these fields.

In case of proprietary wake-up frames, the wake-up key can be encoded and transmitted in a field at the beginning of the PHY header, before the STF is transmitted. To simplify the decoding of the wake-up key, the key can be encoded with the same modulation used for the STF, Binary Phase Shift Keying (BPSK) for 802.11ah, which can be decoded using a limited power budget. The key may consist of a series or repeated sequences encoding a bit string.

Alternatively, for S1G compatible wake-up, the wake-up key can be encoded in a portion of the STF. The PHY may use a series of correlators to compare the encoded wake-up values with reference wake-up key values stored in a memory portion.

A predetermined frequency band may be used to encode the wake-up key in the PPDU preamble using BPSK. For example, the key may be transmitted using a frequency band below 1 MHz.

In some instances, the step of decoding the wake-up key in the STF may be performed by driving the analog-to-digital converter (ADC) and in a low-power mode. The low power mode may use a clock frequency lower than the clock frequency used when the ADC and the processing device are in a normal-power mode.

Figure 5B:
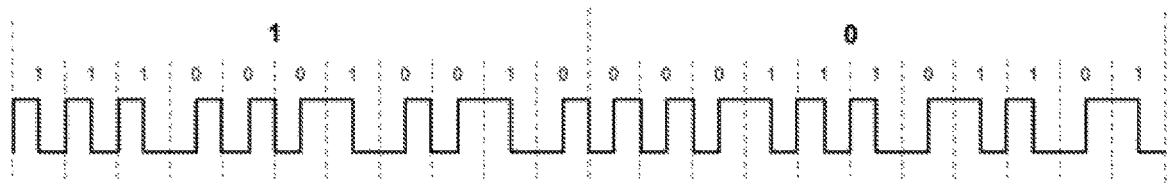
FIG. 5B shows an example of two bit encoding for a wake-up key.

The wake-up key can be encoded using a coding scheme such as a Manchester or a Barker sequence that allows to count the number of errors in a very short time. The Barker sequence may be such that a 1 is encoded as HL (3 μs ON followed by 3 μs OFF, for example) and a 0 is encoded as LH (3 μs OFF followed by 3 μs ON). An example of two bit encoding for a wake-up key is shown in FIG. 5B. The figure shows from top to bottom: bits, Barker encoding and Manchester encoding.

After encoding, the wake-up key is modulated using BPSK and transmitted on the WM. After demodulation by the STA, the wake-up key can be decoded using the same bank of correlators used to correlate the STF. These correlators can be programmed to decode the wake-up key whether this is transmitted before the STF in a proprietary format, or as a portion of the STF field of the S1G PPDU.

During decoding and validation, the radio and the PHY processor are configured to minimize energy consumption by decoding the wake-up key in a narrow frequency range. In some instances, the frequency range may be different to the band used to transmit the PPDU. For example, the wake-up key may be transmitted on the secondary subchannel in a subband different to the one used to transmit the PPDU. All other hardware resources of the STA are kept in sleep-mode. If the result of the correlation does not meet a predetermined threshold, the wake-up key is deemed as not verified and the STA goes back into sleep mode until the next listening period.

If the result of the correlation process meets the requirements for validation of the wake-up key, the wake-up detect module proceeds to wake-up all the resources of the PHY processor that can proceed to decoding the remaining portion of the PPDU.

Once the PPDU has been received, the PHY processor can perform a second validation of the wake-up signal by checking the value of a plurality of bits in the SIG field of the Short Frame PHY Header (SIG-A for the Long Frame).

FIG. 6A shows a flow diagram 600 outlining method steps for preparing a PHY Protocol Data Unit (PPDU) for waking-up a wireless receiver on a wireless network and the configuration of SIG fields used in such wake-up PPDUs in accordance with an embodiment of the disclosure.

The AP identifies the STA, or STAs, that needs to be woken-up. A wake up PPDU is prepared by encoding the wake-up key in a preamble, 602, for example as a proprietary field at the beginning of the PPDU or in the STF of the PPDU. After the STF and long training fields (LTFs) have been encoded, the AP prepares a wake-up SIG field with specific bits that allow the STA PHY to validate the PPDU as wake-up PPDU, 604. The STA wake-up address is encoded in an address field of the proprietary SIG field, 606. The address can be directed to a single STA or be a multicast address. The wake-up PPDU is transmitted over the wireless network, 608. A CTS frame may be sent on the WM before the wake-up PPDU.

FIG. 6B shows the configuration, bit-by-bit, of an example of SIG field configured to be transmitted with a wake-up PPDU. Specific bits in the TYPE field can be used to confirm the PPDU as a wake-up PPDU and the ADDRESS field to address the specific station, or a group of STAs.

In the case of a S1G compatible SIG field, the NDP indication bit is set to 0 together with one of the reserved bits.

If the STA confirms the PDU as a wake-up PDU, the wake-up detect module can decode the wake-up address for verification. If the address is verified, the entire STA architecture can be powered and the wake-up can be acknowledged to the AP using an encrypted frame.

Figure 7A:
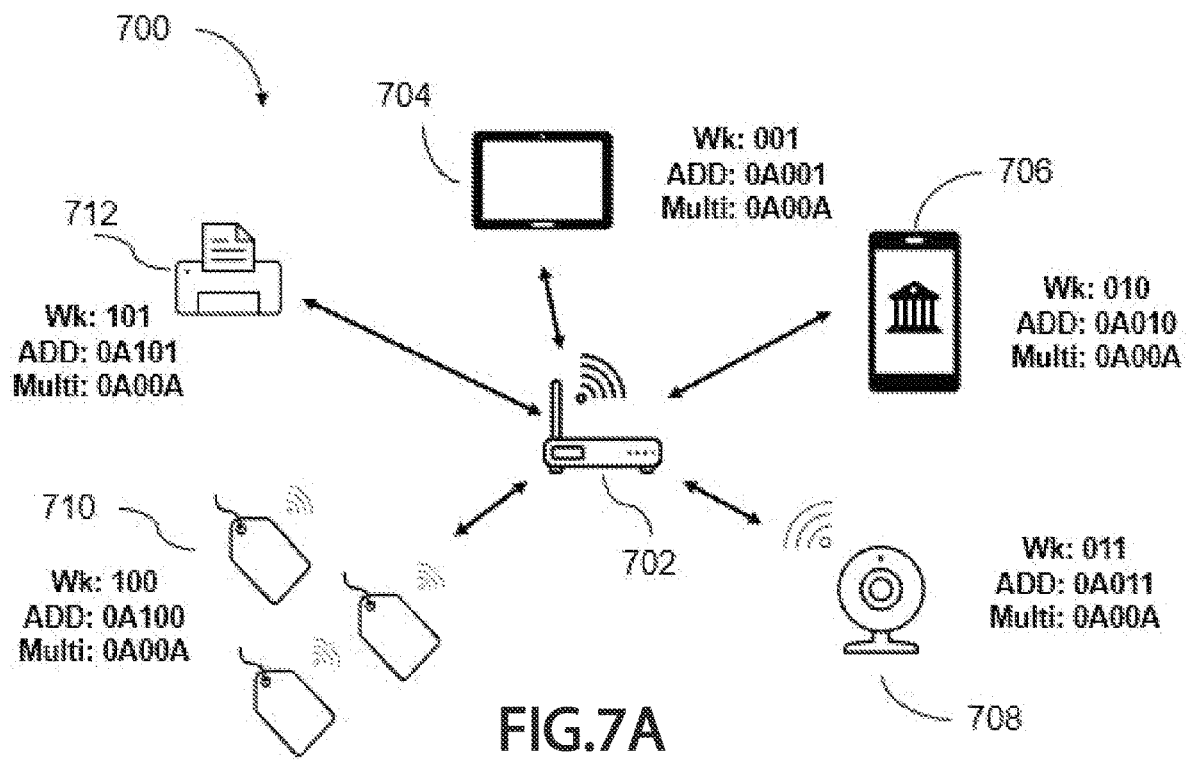
FIG. 7A shows a schematic of a wireless network using a wake-up process and process timelines for a successful STA wake-up in accordance with an embodiment of the disclosure.

FIG. 7A shows a schematic of a wireless network 700 using a wake-up process and a wake-up process timelines for a successful STA wake-up in accordance with an embodiment of the disclosure. The network 700 may resemble, for example, a large supermarket network.

AP 702 communicates with user communication devices 704, 706, remote cameras 708, electronic tags 710 and printers 712. In this example, each group of devices is configured with a given wake-up key, for example the wireless cameras 708 have the wake-up key 011 and the electronic tags 710 have a wake-up key 100. In alternative configurations all STAs may share the same wake-up key. Each device connected to the network has a unique wake-up address, one the wireless cameras, for example has wake-up address 0A011. The camera 708 can be woken up using a PPDU that carries the 011 wake up-key, an appropriate SIG field and the 0A011 wake-up address. All cameras can be woken-up by using the MAC multicast address 0A00A (HEX notation is used herein for wake-up addresses for convenience).

Figure 7B:
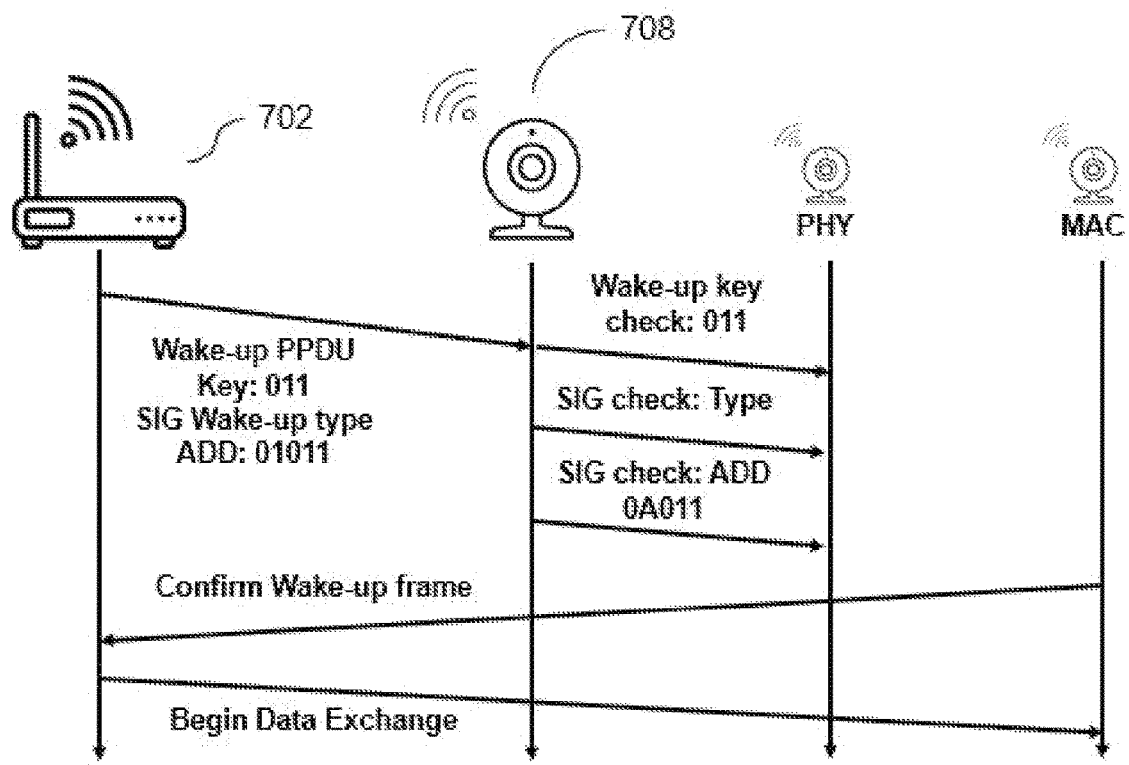
FIG. 7B shows a schematic timeline of the wake-up process for one wireless camera.

FIG. 7B shows a schematic timeline of the wake-up process for one of the wireless cameras 708.

Initially the camera 708 is in sleep-mode. The STA radio module wakes-up periodically, for example every 300 ms, together with registers and correlators used to decode the wake-up key, to listen for wake-up PPDUs on the WM. When the incoming wake-up PPDU is detected by the radio, the beginning of the PHY preamble is demodulated and the wake-up key (011) is decoded and validated by the PHY (lower PHY, low power). After the key is confirmed the PHY is fully powered, and the SIG field is demodulated and decoded to validate the wake-up PPDU and address. If the wake-up address matches (0A011 or 0A00A) the MAC processor is powered up, a MAC level address may also be validated optionally. Subsequently, an encrypted message may be exchanged with the access point to confirm wake-up and communication can be initiated.

If, at any point, a wake-up verification fails, the STA goes back into sleep mode and triggers safety mechanisms in accordance with the protocols described above with reference to FIG. 3.

In some instances, the network may be configured by the AP to send wake-up PPDUs on the secondary channels and use the primary for immediate data exchange. This approach can only be used when a secondary channel is available and free of interference.

Figure 8:
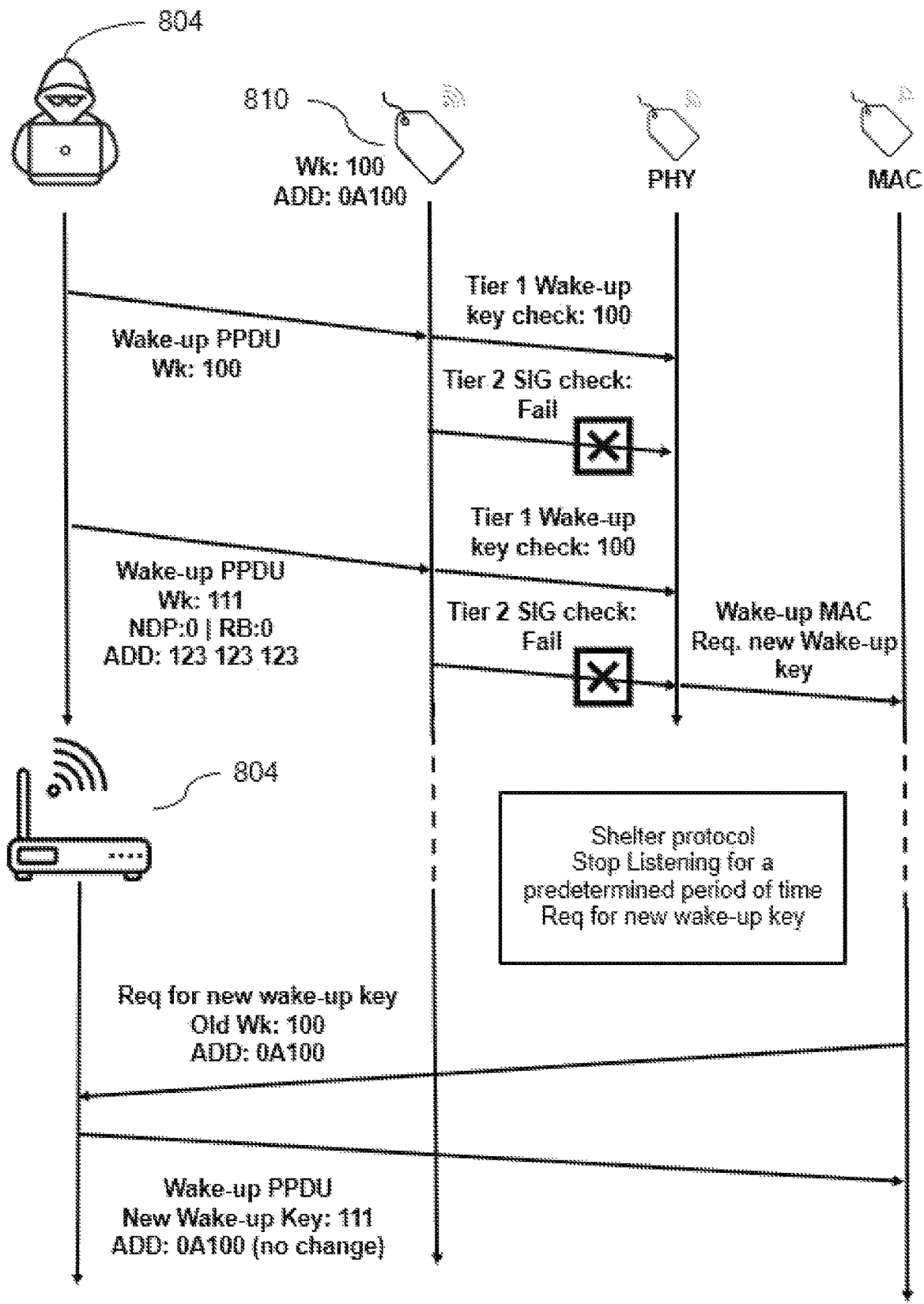
FIG. 8 shows an example of denial of sleep attack and unsuccessful STA wake-up in accordance with an embodiment of the disclosure.

FIG. 8 shows a schematic of a non-legitimate wake-up signal sent from a device over the WM to one of the electronic price tags connected to the WLAN. Such non legitimate wake-up signals may be sent to the tags with the intent of draining the batteries by waking-up the devices frequently. In the instance of FIG. 8, the attacker 802 is using a real wake-up key, but an incorrect SIG field. The radio module, key decoding hardware and PHY layer of the STAs wake-up a number of times to decode the wake-up key and the SIG filed before the shelter protocol is triggered and a new wake-up key requested to the AP using an encrypted message.

In some instances, a shelter protocol is initiated by the STA or the AP to keep the STA in a sleep mode for a predetermined period of time as a precaution. However, after a new wake-up key is received by the STA, the attacker is no longer able to wake up the MAC processor and further attacks may be stopped at PHY level.

Figure 9:
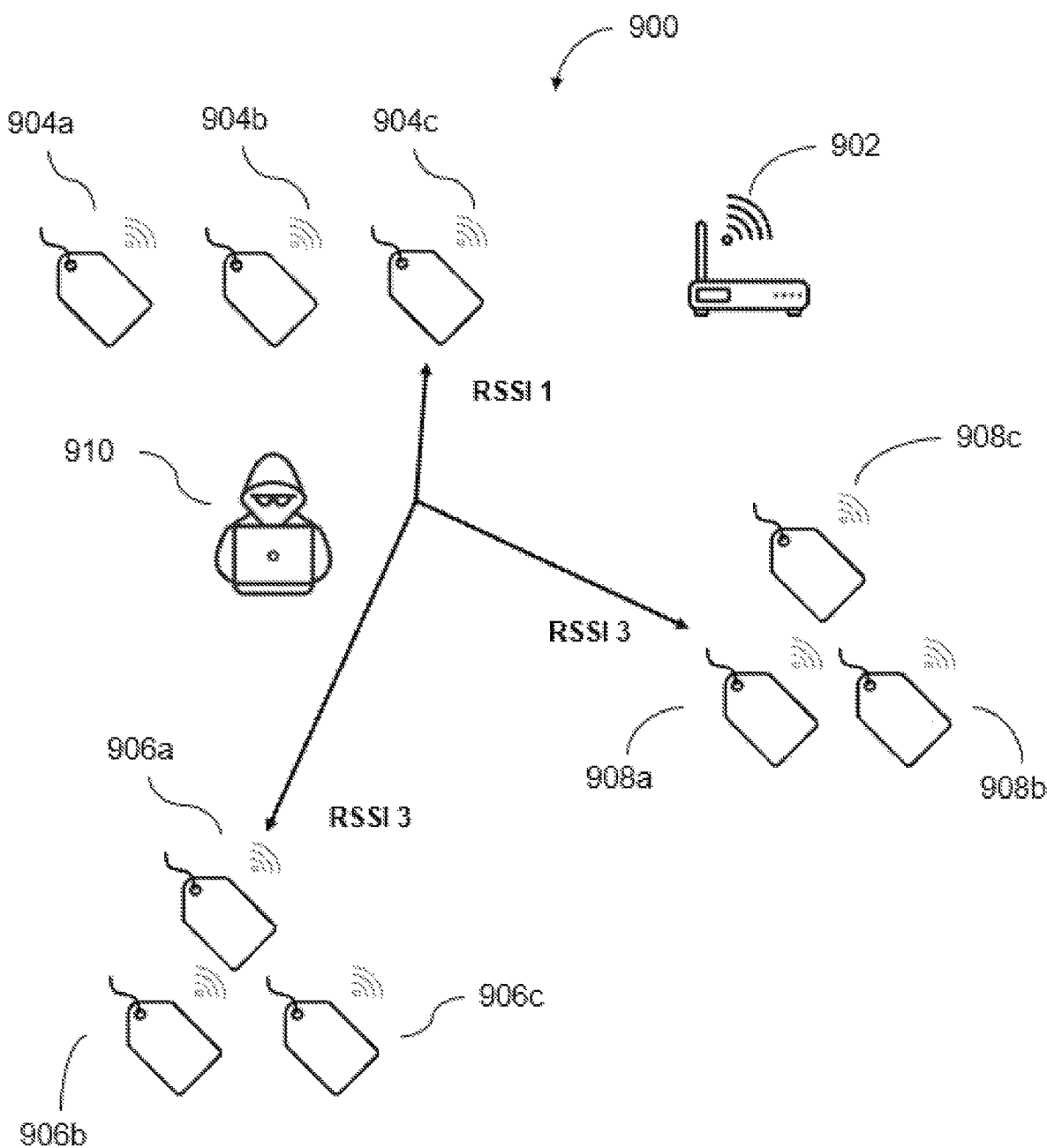
FIG. 9 schematically shows a device launching a denial of sleep (DoS) attack towards a plurality of electronic price tags across a WLAN in accordance with an embodiment of the disclosure.

FIG. 9 schematically shows a WLAN comprising an AP 902 and three sets of electronic price tags (EPTs) 904, 906, 908. A device 910 is launching a denial of sleep (DoS) attack targeting the EPTs. The DoS attack can be managed by each of the STA platforms hosted by each EPT in accordance with the methods outlined above. Once a wake-up attempt is confirmed to be malicious, an STA can transmit received signal strength indication (RSSI) information to the AP 902. Location information can also be relayed back to the AP 902, if available.

The units for RSSI values are not specified and can have an arbitrary range where a greater RSSI value indicates a stronger signal. However, a reference power level is usually considered, such as 1 mW, and the received power level of a signal is compared to the reference level, such as the ratio of the received signal power level to the reference power level. If such ratio is expressed as a logarithmic level, the dBm unit for power level is obtained.

In the example of FIG. 9, when the STAs of the first group 904a, 904b, and 904c detect a malicious wake-up signal can enter the shelter protocol and transmit RSSI1 and location information to the AP; the STAs of the second group 906a, 906b, and 906c transmit RSSI2 and location information to the AP; and the STAs of the third group 908a, 908b, and 908c transmit RSSI3 and location information to the AP.

Using the three pairs of RSSI and location information, the AP can approximately calculate the location of the DoS attacking device across the geographical area surrounding the WLAN. Such information can be forwarded to a high-level application and, in turn, to a network administrator for investigation.

The location of the attack may be investigated in a simpler way just by using RSSI data to calculate which STA is closest to the attacking device. Appropriate decisions can be made by higher level applications or human operators.

Although the invention has been described in terms of devices and methods of waking-up a STA on a WLAN, it is contemplated that one or more products may be implemented in software on microprocessors/general purpose computers (not shown). In these embodiments, one or more of the functions of the various components may be implemented in software that controls a general-purpose computer. This software may be embodied in a non-transitory computer readable medium, for example, RAM, a magnetic or optical disk or a memory-card.

Although the invention is illustrated and described herein with reference to specific embodiments, the invention is not intended to be limited to the details shown. Rather, various modifications may be made in the details within the scope and range of equivalents of the claims and without departing from the invention. For example, the wake-up process may be used in reverse, namely keys may be sent to devices to keep them in sleep mode when wake-up is not required.

It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

Throughout this specification, unless the context clearly requires otherwise, the word "comprise", or variations such as "comprises" or "comprising", will be understood to imply the inclusion of a stated element, integer or step, or group of elements, integers, or steps, but not the exclusion of any other element, integer or step, or group of elements, integers, or steps.

Any discussion of documents, acts, materials, devices, articles, or the like which has been included in the present specification is solely for the purpose of providing a context for the present technology. It is not to be taken as an admission that any or all these matters form part of the prior art base or were common general knowledge in the field relevant to the present technology as it existed before the priority date of each claim of this specification.

What is claimed is:

1. A method for waking-up a wireless receiver on a wireless network, the method comprising the steps of:
   listening, by the wireless receiver, for signals in a predetermined frequency band periodically and decoding a wake-up key;
   validating the wake-up key by correlating the wake-up key with values stored in a memory;
   upon validation of the wake-up key, decoding at least one PHY Protocol Data Unit (PPDU) using a first processing device and checking the value of one or more bits of the PPDU to validate the decoded PPDU as a wake-up PPDU; and
   upon validation of the wake-up PPDU, decoding a wake-up address, and comparing the wake-up address to a station (STA) wake-up address.

2. The method of claim 1, further comprising the step of powering-up a second processing device and confirming wake-up by exchanging a frame with an Access Point (AP) if the decoded wake-up address matches the STA wake-up address.

3. The method of claim 2, wherein the first processing device comprises a physical layer processing device (PHY) and the second processing device comprises a media-access-control layer processing device (MAC).

4. The method of claim 1, wherein the method further comprises the step of confirming, by communication with an AP, if the wake-up is genuine.

5. The method of claim 1, wherein the predetermined frequency band is a narrow frequency band with a bandwidth below 1 MHz.

6. The method of claim 1, wherein the wireless receiver goes back to sleep-mode when the wake-up key is not validated.

7. The method of claim 1, further comprising the step of requesting a new wake up key from the AP when:
   the value of a false wake-up counter is higher than a predetermined false wake-up threshold value;
   the decoded PPDU is not validated;
   the wake-up address is not validated; or
   a genuine wake-up is not confirmed with the AP.

8. The method of claim 1, wherein the step of listening for signals in a narrow frequency band periodically and decoding a wake-up key is performed at predetermined time intervals.

9. The method of claim 1, wherein the step of listening for signals in a narrow frequency band comprises enabling an analog-to digital-converter (ADC) and a processing device in a low-power mode.

10. The method of claim 1, wherein the step of checking the value of a plurality of bits of the PPDU comprises checking one or more bits of a signal field (SIG) of the PPDU purposely configured for the wake-up PPDU.

11. The method of claim 10, further comprising powering-up the entire architecture and beginning data communication with the Access Point (AP) to confirm genuine wake-up by sending an encrypted trigger frame to the AP to elicit buffered frames from the AP.

12. The method of claim 1, further comprising the step of collecting wake-up signal related data for wake-up signals that cannot be validated and transmitting the collected data to an AP.

13. The method of claim 1, wherein the wake-up key is in a preamble of the PPDU.

14. The method of claim 13, wherein the wake-up key is in a proprietary of the PPDU.

15. A wireless device for performing wireless communications in a wireless network comprising:
   a radio frequency (RF) module arranged to receive and transmit radio frequency signals;
   an analog-to-digital (ADC) converter;
   a plurality of digital filters;
   a plurality of processing devices comprising a first processing device; and
   a memory comprising instructions to perform a method including the following steps:
      listening, by the RF module, for signals in a predetermined frequency band periodically;
      decoding a wake-up key;
      validating the wake-up key by correlating the wake-up key with values stored in the memory;
      if the wake-up key is validated, decoding at least one PHY Protocol Data Unit (PPDU) using the first processing device and checking the value of one or more bits of the PPDU to validate the decoded PPDU as a wake-up PPDU; and
      if the wake-up PPDU is validated, decoding a wake-up address, and comparing the wake-up address to a station (STA) wake-up address.

16. The wireless device of claim 15, further comprising a wake-detect module arranged to generate a low-frequency clock signal.

17. The wireless device of claim 16, further comprising an on-board clock device for generating clock signals to drive modules of the wireless device, wherein the low-frequency clock signal is generated using the on-board clock device.

* * * * *